United States Patent
An et al.

(10) Patent No.: US 10,233,968 B2
(45) Date of Patent: Mar. 19, 2019

(54) BEARING DEVICE AND SUPERCHARGER

(71) Applicant: MITSUBISHI HEAVY INDUSTRIES ENGINE & TURBOCHARGER, LTD., Kanagawa (JP)

(72) Inventors: Byeongil An, Tokyo (JP); Hiroshi Suzuki, Tokyo (JP); Naomichi Shibata, Tokyo (JP)

(73) Assignee: Mitsubishi Heavy Industries Engine & Turbocharger, Ltd., Sagamihara-shi, Kanagawa (JP)

( * ) Notice: Subject to any disclaimer, the term of this patent is extended or adjusted under 35 U.S.C. 154(b) by 0 days.

(21) Appl. No.: 15/569,437

(22) PCT Filed: Jun. 4, 2015

(86) PCT No.: PCT/JP2015/066205
§ 371 (c)(1),
(2) Date: Oct. 26, 2017

(87) PCT Pub. No.: WO2016/194198
PCT Pub. Date: Dec. 8, 2016

(65) Prior Publication Data
US 2018/0080499 A1 Mar. 22, 2018

(51) Int. Cl.
*F16C 25/08* (2006.01)
*F16C 27/06* (2006.01)
(Continued)

(52) U.S. Cl.
CPC .......... *F16C 25/083* (2013.01); *F01D 25/164* (2013.01); *F16C 19/525* (2013.01);
(Continued)

(58) Field of Classification Search
CPC ...... F16C 19/08; F16C 19/163; F16C 27/066; F16C 33/581; F16C 35/042; F16C 35/063;
(Continued)

(56) References Cited

U.S. PATENT DOCUMENTS 3,132,594 A * 5/1964 Shiley .................... F01D 25/246
415/139
3,424,508 A * 1/1969 Probert .................... F16C 33/66
384/535
(Continued)

FOREIGN PATENT DOCUMENTS

JP     1-162046 U     11/1989
JP    2002-369474 A   12/2002
(Continued)

OTHER PUBLICATIONS

International Search Report and Written Opinion of the International Searching Authority (Forms PCT/ISA/237 and PCT/ISA/210), dated Sep. 1, 2015, for International Application No. PCT/JP2015/066205, with an English translation.

*Primary Examiner* — Marcus Charles
(74) *Attorney, Agent, or Firm* — Birch, Stewart, Kolasch & Birch, LLP (57) ABSTRACT

A rolling bearing for rotatably supporting a rotating shaft; a housing for externally covering the rolling bearing in the radial direction of the rotating shaft; a sleeve disposed inside the housing in the radial direction of the rotating shaft with a gap there between and provided so as to be incapable of being displaced relative to an outer ring in the radial direction and circumferential direction of the rotating shaft; and a damper provided between the housing and the sleeve to support the sleeve so that the sleeve can be displaced relative to the housing in the axial direction of the rotating
(Continued)

shaft, the damper absorbing the displacement of the sleeve in the radial direction of the rotating shaft.

10 Claims, 5 Drawing Sheets

(51) Int. Cl.
    *F16C 35/077*     (2006.01)
    *F16C 35/04*     (2006.01)
    *F01D 25/16*     (2006.01)
    *F16C 19/08*     (2006.01)
    *F16C 19/52*     (2006.01)
    *H02K 5/173*     (2006.01)
    *F16C 19/54*     (2006.01)

(52) U.S. Cl.
    CPC .......... *F16C 27/066* (2013.01); *F16C 35/042* (2013.01); *F16C 35/077* (2013.01); *F05D 2220/40* (2013.01); *F16C 19/547* (2013.01); *F16C 2360/44* (2013.01); *F16C 2380/26* (2013.01); *H02K 5/1732* (2013.01)

(58) Field of Classification Search
    CPC .. F16C 2360/24; F16C 25/083; F01D 25/164; F05D 2220/40; H02K 5/1732; F16F 35/077
    USPC ....... 384/275, 477, 490, 518, 489, 535, 906; 417/174.2, 407; 415/119; 123/565
    See application file for complete search history.

(56) References Cited

U.S. PATENT DOCUMENTS

| | | | | |
|---|---|---|---|---|
| 4,329,000 A | * | 5/1982 | Keske | F01D 25/16 384/464 |
| 4,652,219 A | * | 3/1987 | McEachern, Jr. | F01D 25/16 384/518 |
| 4,808,091 A | * | 2/1989 | Ruetz | F01D 25/16 384/556 |
| 5,055,009 A | * | 10/1991 | Gutknecht | F01D 25/125 384/476 |
| 5,253,985 A | * | 10/1993 | Ruetz | F01D 25/164 384/473 |
| 6,220,829 B1 | * | 4/2001 | Thompson | F01D 25/164 417/407 |
| 9,360,082 B2 | * | 6/2016 | Hilton | F16C 27/066 |
| 9,638,198 B2 | * | 5/2017 | Norton | F01D 25/16 |
| 2003/0007705 A1 | | 1/2003 | Bosen et al. | |
| 2004/0244201 A1 | * | 12/2004 | Di Giacomo | B21B 31/074 29/898.07 |
| 2007/0183704 A1 | * | 8/2007 | Umekawa | F01D 25/16 384/517 |
| 2011/0081231 A1 | * | 4/2011 | Hoelzer | F04D 19/042 415/119 |
| 2011/0085753 A1 | * | 4/2011 | Tecza | F16C 27/066 384/462 |
| 2012/0282078 A1 | * | 11/2012 | Marsal | F04D 29/059 415/1 |
| 2012/0308366 A1 | * | 12/2012 | Petitjean | F01D 25/16 415/170.1 |
| 2014/0090626 A1 | * | 4/2014 | An | H02K 5/1732 123/565 |

FOREIGN PATENT DOCUMENTS

| | | |
|---|---|---|
| JP | 2006-234098 A | 9/2006 |
| JP | 2009-281278 A | 12/2009 |
| JP | 2013-24059 A | 2/2013 |
| JP | 5535992 B2 | 7/2014 |

\* cited by examiner

BEARING DEVICE AND SUPERCHARGER

CROSS-REFERENCE TO RELATED APPLICATIONS

This application is the National Phase of PCT/JP2015/066205, filed on Jun. 4, 2015.

TECHNICAL FIELD

The present invention relates to a bearing device and a supercharger.

BACKGROUND ART

In a vehicle such as an automobile, in order to improve the thermal efficiency of an internal combustion engine, a supercharger which compresses the outside air and feeds the compressed air to a cylinder may be mounted. As the supercharger, a turbocharger which rotates a turbine by the exhaust of an internal combustion engine to drive a compressor is known. However, in the turbocharger, improvement of turbo lag, improvement of response, or the like is required.

PTL 1 discloses a supercharger including an electric motor. In the supercharger including the electric motor, the improvement of the turbo lag or the response generated in the above-described turbocharger can be expected. However, in the supercharger, vibrations are likely to increase during rotation due to the weight of a rotor of the electric motor. Accordingly, in the supercharger of PTL 1, in order to decrease vibrations, the rotor is rotatably supported on both sides in an axial direction of the electric motor. However, the vibrations of the supercharger increase as a rotation speed of the electric motor increases. Accordingly, there is a case where noise becomes large only by supporting the rotor on both sides in the axial direction of the electric motor.

Therefore, in PTL 1, a sleeve is further provided on the outside in a radial direction of a rolling bearing so as to have a gap between the sleeve and the rolling bearing, and the sleeve is elastically supported from the outside in the radial direction by a damper mechanism. Accordingly, in PTL 1, thermal expansion of the rolling bearing in the radial direction is absorbed by the gap between the rolling bearing and the sleeve, and thus, it is possible to block vibrations of the rotating shaft. Moreover, in the PTL 1, it is possible to prevent transmission of vibrations by the damper mechanism which supports the sleeve.

CITATION LIST

Patent Literature

[PTL 1] Japanese Unexamined Patent Application Publication No. 2013-024059

SUMMARY OF INVENTION

Technical Problem

In the supercharger described in PTL 1, for example, if the sleeve and an outer ring of the rolling bearing rotate relative to each other, vibrations or wears occur due to the relative rotation. Accordingly, in order to prevent the relative rotation between the sleeve and the outer ring of the rolling bearing, a key for detent is machined on the outer ring of the rolling bearing. In general, the outer ring is formed of a very hard metal or the like and, in the outer ring, there is no room in a space for machining a key or the like. Accordingly, there is a problem that it takes time and labor to machine the key or the like for the outer ring, and thus, cost increases. Moreover, in the case of the supercharger described in PTL 1, since the gap exists between the sleeve and the outer ring, the sleeve and the outer ring come into intermittent contact with each other due to vibrations, and the sleeve and the outer ring are likely to be worn.

An object of the present invention is to provide a bearing device and a supercharger capable of easily preventing a rotation of an outer ring and decreasing wears while absorbing thermal deformation, assembly tolerance, and disturbance elements at the time of rotation.

Solution to Problem

According to a first aspect of the present invention, there is provided a bearing device including: a rolling bearing which rotatably supports a rotating shaft; and a housing which externally covers the rolling bearing in a radial direction of the rotating shaft. The bearing device further includes a damping member which is disposed inside the housing in the radial direction of the rotating shaft with a gap therebetween and is provided so as not to be displaceable with respect to an outer ring of the rolling bearing in the radial direction and a circumferential direction of the rotating shaft. The bearing device further includes a damper which is provided between the housing and the damping member to support the damping member so as to be displaceable with respect to the housing in an axial direction of the rotating shaft, and absorbs displacement in the radial direction of the rotating shaft generated in the damping member.

In the first aspect, the damping member of the bearing device is provided so as not to be displaceable with respect to the outer ring in the radial direction and the circumferential direction of the rotating shaft. Accordingly, it is possible to prevent the rolling bearing and the damping member from coming into intermittent contact with each other due to vibrations of the rotating shaft. In addition, the damping member is supported by the housing so as to be displaceable in the axial direction of the rotating shaft via the damper. Accordingly, even in a case where thermal deformation and assembly tolerance in the axial direction of the rotating shaft of the rolling bearing, the rotating shaft, or the like and disturbances when the rotating shaft rotates are generated, the damping member can be displaced with respect to housing in the axial direction of the rotating shaft so as to escape. In the bearing device of the first aspect, if the rotation of the damping member with respect to the housing is prevented, the rolling bearing is prevented from rotating with respect to the housing. Accordingly, it is possible to prevent the rotation of the outer ring without cutting the outer ring or the like.

As a result, it is possible to easily prevent the rotation of the outer ring while absorbing thermal deformation, assembly tolerance, and disturbance elements at the time of rotation, and it is possible to decrease wears.

According to a second aspect of the present invention, in the bearing device, the outer ring according to the first aspect may be press-fitted to the damping member.

According to the configuration, it is possible to easily restrict the displacement of the damping member with respect to the outer ring.

According to a third aspect of the present invention, in the bearing device, the outer ring according to the first aspect may be integrally formed with the damping member.

Accordingly, it is possible to substantially prevent the relative displacement of the damping member with respect to the outer ring. In addition, it is possible to reduce the number of parts of the bearing device.

According to a fourth aspect of the present invention, in the bearing device, the damping member according to any one of the first to third aspects may include a preload portion which elastically presses the outer ring in the axial direction of the rotating shaft.

According to this configuration, it is possible to apply a preload to the rolling bearing by the preload portion. In addition, the preload portion can elastically absorb the thermal deformation and the assembly tolerance of the rotating shaft or the like and the displacement caused by the disturbances at the time of rotation.

According to a fifth aspect of the present invention, in the bearing device, the damping member according to any one of the first aspect to fourth aspects may be formed to be divided into at least two of a first member and a second member in the axial direction of the rotating shaft. The first member of the damping member may be provided so as not to be displaceable with respect to the outer ring in the radial direction and the circumferential direction of the rotating shaft. The second member of the damping member may be connected to the first member so as not to be displaceable in the circumferential direction of the rotating shaft and so as to be displaceable in the axial direction of the rotating shaft. Moreover, the second member of the damping member may be detachably fixed to the housing and may be joined to the housing so as not to be displaceable in the axial direction and the circumferential direction of the rotating shaft.

According to this configuration, when the assembly is performed, it is possible to prevent the rotations of the first member and the outer ring with respect to the housing via the second member. As a result, the assembly can be easily performed. Moreover, the second member is detachably provided with respect to the housing. Accordingly, it is possible to easily confirm the state of the first member by only removing the second member.

According to a sixth aspect, there is provided a supercharger including: a compressor wheel; an electric motor which drives the compressor wheel; and the bearing device according to any one of the first to fifth aspects.

According to this configuration, it is possible to decrease vibrations or noise generated when the electric motor is driven and the compressor wheel rotates. Therefore, merchantability can be improved and durability can be improved by decreasing wears.

Advantageous Effects of Invention

According to the bearing device and the supercharger, it is possible to easily prevent a rotation of an outer ring and decreasing wears while absorbing thermal deformation, assembly tolerance, and disturbance elements at the time of rotation.

DESCRIPTION OF EMBODIMENTS

First Embodiment

A bearing device and a supercharger in a first embodiment of the present invention will be described with reference to the drawings.

The bearing device in the first embodiment rotatably supports a rotating shaft of the supercharger. For example, the supercharger of the first embodiment pressurizes intake air of an internal combustion engine provided in a vehicle such as an automobile.

Figure 1:
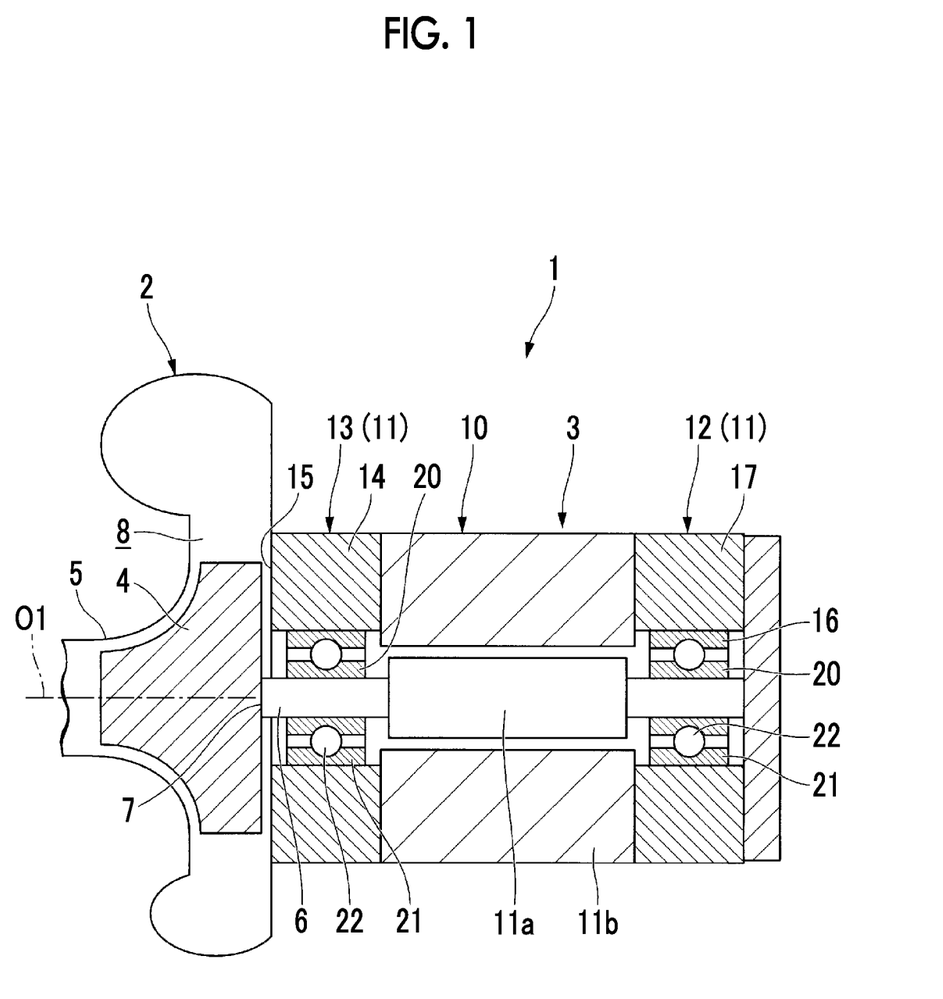
FIG. 1 is a sectional view showing a schematic configuration of a supercharger in a first embodiment of the present invention.

FIG. 1 is a sectional view showing a schematic configuration of the supercharger in the first embodiment of the present invention.

As shown in FIG. 1, a supercharger 1 includes a compressor portion 2 and a drive portion 3.

For example, the compressor portion 2 compresses the outside air taken in via an air cleaner box or the like and feeds the compressed air to an internal combustion engine. In this embodiment, the compressor portion 2 configures a so-called centrifugal compressor. The compressor portion 2 includes a compressor wheel 4 and a compressor housing 5.

The compressor wheel 4 rotates about an axis O1 to compress air. The compressor wheel 4 is integrally provided with a shaft end portion 7 of a rotating shaft 6 extending from the drive portion 3.

The compressor wheel 4 is rotatably accommodated inside the compressor housing 5. A space 8 inside the compressor housing 5 forms a portion of a flow path for supplying outside air to an internal combustion engine.

The compressor housing 5 of this embodiment has an opening portion (not shown) on a wall portion on a side on which the drive portion 3 is disposed. The above-described rotating shaft 6 extends from the drive portion toward the inside of the space 8 through the opening portion. In this embodiment, the compressor housing 5 is fixed to a housing 14 of the drive portion 3.

The drive portion 3 generates a drive force by which the compressor wheel 4 is rotated. The drive portion 3 includes an electric motor 10 and a bearing device 11.

The electric motor 10 converts electric energy supplied from the outside into rotation energy of the rotating shaft 6. For example, in this embodiment, power is supplied to the electric motor 10 from a battery, an alternator, or the like. The electric motor 10 includes a rotor 11a and a stator 11b. The rotor 11a is configured of a permanent magnet or the like provided in the above-described rotating shaft 6. The stator 11b is disposed outside the rotor 11a in a radial direction of the rotating shaft 6 with a gap between the rotor 11a and the stator 11b. For example, the stator 11b is formed of winding or the like.

The bearing device 11 rotatably supports the rotating shaft 6 on both outer sides of the electric motor in an axis O direction of the rotating shaft 6. Hereinafter, the bearing device 11 which is disposed on a side opposite to the compressor portion 2 in a state where the electric motor 10 is interposed therebetween is referred to a first bearing device 12. The bearing device 11 which is disposed between the electric motor 10 and the compressor portion 2 is referred to as a second bearing device 13.

Figure 2:
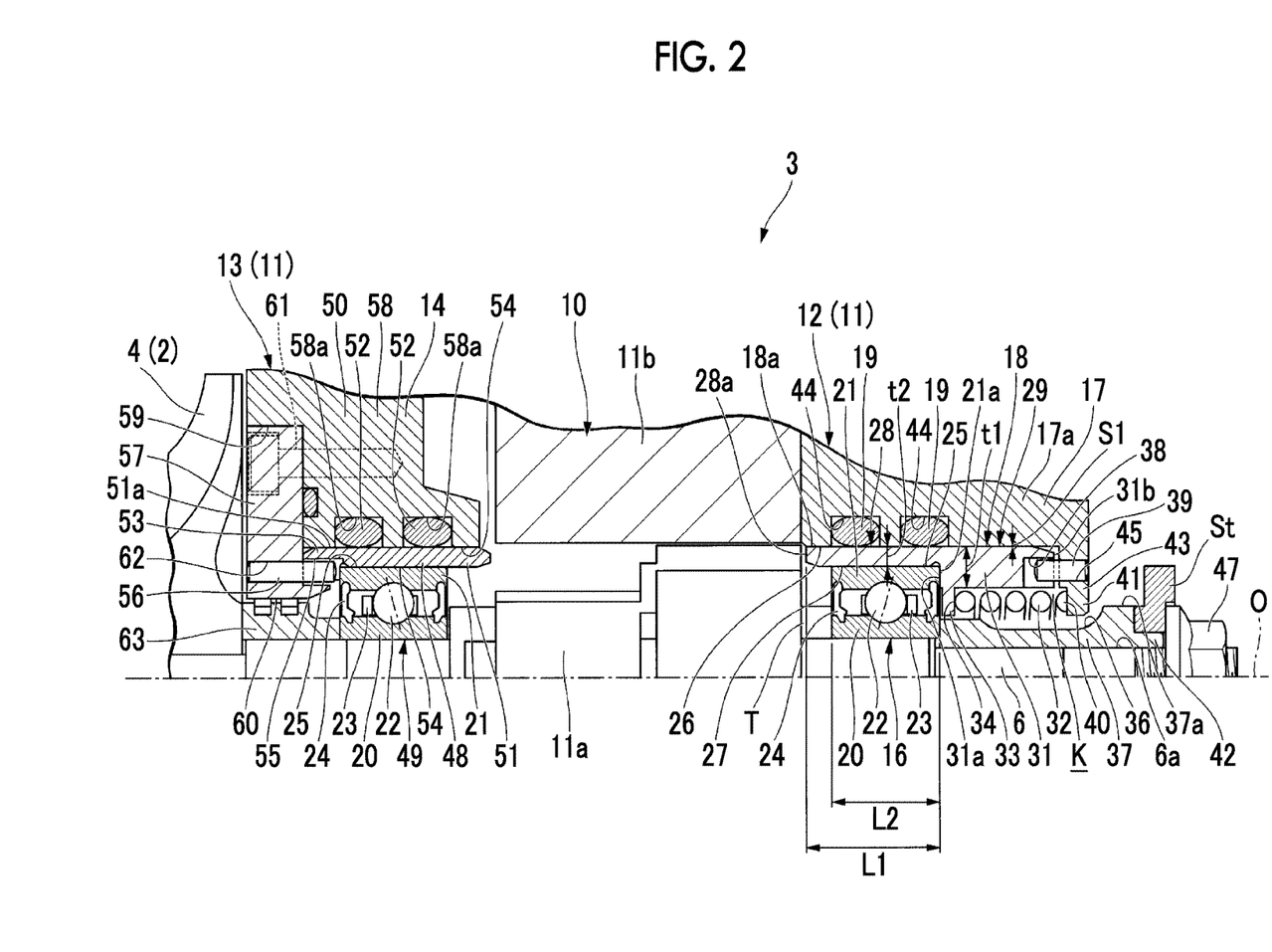
FIG. 2 is a sectional view showing a drive portion in the first embodiment of the present invention in an enlarged manner.

FIG. 2 is a sectional view showing the drive portion in the first embodiment of the present invention in an enlarged manner.

As shown in FIGS. 1 and 2, the first bearing device includes a first rolling bearing 16, a first bearing housing 17 (housing), a first sleeve 18 (damping member; refer to FIG. 2), and a first damper 19 (refer to FIG. 2).

For example, the first rolling bearing 16 is an angular bearing or the like which requires a preload in the axis O direction. The first rolling bearing 16 includes an inner ring 20, an outer ring 21, a rolling body 22, a holder 23, and a seal member 24. The inner ring 20 is fixed to the rotating shaft 6 by a press-fitting or the like. A plurality of rolling bodies 22 are provided between the inner ring 20 and the outer ring 21. The holder 23 rollably holds the rolling bodies 22 such that the plurality of rolling bodies 22 are disposed at intervals therebetween in a circumferential direction of the inner ring 20. The seal member 24 closes each of openings formed between the inner ring 20 and the outer ring 21. The seal member 24 prevents leakage of grease sealed between the inner ring 20 and the outer ring 21 and entering of dust or the like.

The outer ring 21 includes an outer peripheral surface 25 which is parallel to the axis O. The outer ring 21 is fixed to the first sleeve 18 by press-fitting or the like. In other words, the outer ring 21 is fixed to the first sleeve 18 so as not to be displaceable in the axis O direction and the circumferential direction of the rotating shaft 6. A method for fixing the outer ring 21 and the first sleeve 18 to each other adopts any method as long as the outer ring 21 and the first sleeve 18 are fixed so as not to be displaceable to each other, and is not limited to the press-fitting. As other methods for fixing the outer ring 21 and the first sleeve 18 to each other, for example, welding, adhesion, cold fitting, shrinkage fitting, or the like can be mentioned. Here, the inner ring 20 is interposed between a spacer 37 fixed to the rotating shaft 6 and an annular projection T provided on the rotating shaft 6, and thus, the displacement of the inner ring in the axis O direction is restricted.

The first sleeve 18 is formed in an annular shape. The first sleeve 18 is disposed inside the first bearing housing 17 in the radial direction of the rotating shaft 6 via a gap S1. In other words, an outer peripheral surface 18a of the first sleeve 18 and an inner peripheral surface of the first bearing housing 17 are disposed to be separated from each other so as not to come into contact with each other.

The first sleeve 18 includes a bearing holding portion 28 and a preload portion 29.

The bearing holding portion 28 is formed in a tubular shape which externally covers the first rolling bearing 16 in the radial direction of the rotating shaft 6. The bearing holding portion 28 holds the outer ring 21 of the first rolling bearing 16 such that the outer ring 21 cannot be displaced in the axis O direction and in the circumferential direction of the rotating shaft 6. The bearing holding portion 28 includes an inner peripheral surface 27 which comes into surface contact with the entire surface of the outer peripheral surface 25 of the outer ring 21.

A dimension L1 of the bearing holding portion 28 in the axis O direction is slighter longer than a dimension L2 of the first rolling bearing 16 in the axis O direction. Accordingly, the bearing holding portion 28 protrudes toward the rotor 11a side from the first rolling bearing 16. An end portion 28a of the bearing holding portion 28 formed as described above is disposed to be separated from the rotor 11a in the axis O direction such that the end portion 28a does not come into contact with the rotor 11a.

The preload portion 29 performs a preload of the first rolling bearing 16. More specifically, the preload portion 29 presses the outer ring 21 of the first rolling bearing 16 toward the rotor 11a side in the axis O direction of the rotating shaft 6. The preload portion 29 includes a preload portion main body 31 and a preload spring 32.

The preload portion main body 31 is integrally formed with the above-described bearing holding portion 28. In this embodiment, the preload spring 32 is a coil spring and urges the first sleeve 18 toward the rotor 11a side in the axis O direction by elasticity thereof. A thickness t1 of the preload portion main body 31 in the radial direction is thicker than a thickness t2 of the bearing holding portion 28. Accordingly, the preload portion main body 31 includes a vertical surface 31a which faces the rotor 11a side in the axis O direction. The outer ring 21 of the above-described first rolling bearing 16 is disposed such that an end surface 21a of the outer ring 21 comes into surface contact with the vertical surface 31a of the preload portion main body 31.

The preload portion main body 31 includes a protrusion 33 which extends toward the inside in the radial direction of the rotating shaft 6 in the vicinity of the above-described vertical surface 31a. The protrusion 33 supports a first end portion 34 of the preload spring 32 which is compressed in the axis O direction. A slight gap in the radial direction of the rotating shaft 6 is formed between the protrusion 33 and the spacer 37. The spacer 37 is attached to an outer peripheral surface 6a of the rotating shaft 6. The spacer 37 includes a recessed portion 36 on an outer peripheral surface 37a thereof. Accordingly, an accommodation space K in which the preload spring 32 is accommodated is formed between the preload portion main body 31 and the spacer 37 on a side opposite to the first rolling bearing 16 in a state where the protrusion 33 is interposed therebetween.

The preload portion main body 31 includes a locking hole 38 on an end portion 31b on the side opposite to the rotor 11a in the axis O direction. A rotation prevention pin 39 is inserted into the locking hole 38 and a projection portion 43 of the first bearing housing 17 described later. Accordingly, the first sleeve 18 and the first bearing housing 17 are locked to each other, and thus, a relative rotation between the first sleeve 18 and the first bearing housing 17 is restricted. Here, in this embodiment, in order to easily machine the first sleeve 18, the first sleeve 18 may be formed of a material which is softer than the outer ring 21 of the rolling bearing 16.

The first bearing housing 17 externally covers the first sleeve 18 in the radial direction of the rotating shaft 6. The first bearing housing 17 includes the projection portion 43 and first damper accommodation portions 44.

The projection portion 43 is disposed on the side opposite to the rotor 11a in a state where the first sleeve 18 is interposed therebetween. The projection portion 43 extends from the main body 17a of the first bearing housing 17 toward the inside in the radial direction of the rotating shaft 6. The projection portion includes a through-hole 45 at a position facing the locking hole 38 of the first sleeve 18. The through-hole is formed such that the pin 39 for preventing the rotation of the first sleeve 18 can be inserted into and removed from the through-hole 45.

The projection portion 43 has a support portion 41 on the rotating shaft 6 side from the through-hole 45. The support portion 41 is disposed to face the protrusion in the axis O direction and supports a second end portion 40 of the preload spring 32. The projection portion 43 is disposed such that a slight gap is formed between the first sleeve 18 and the projection portion 43 in the axis O direction. Accordingly, even when the first sleeve 18 is displaced in the direction separated from the rotor 11$a$ along the axis O, the first sleeve 18 is prevented from abutting on the projection portion 43 and further displacement of the first sleeve 18 in the axis O direction is prevented.

The first damper accommodation portion 44 is formed on the inner peripheral surface 26 of the first bearing housing 17. More specifically, the first damper accommodation portion 44 is formed to face the outer peripheral surface 18$a$ of the first sleeve 18 at a position on the outside in the radial direction of the first rolling bearing 16 on the inner peripheral surface 26 of the first bearing housing 17. In this embodiment, two first damper accommodation portions 44 are provided at an interval therebetween in the axis O direction. The first damper 19 is accommodated in each of the first damper accommodation portions 44. In this embodiment, the first damper accommodation portion 44 is an annular angular groove which is continuous in the circumferential direction of the first bearing housing 17.

The first damper 19 is provided between the first bearing housing 17 and the first sleeve 18. The first damper 19 elastically supports the first sleeve 18. In this embodiment, the first damper 19 is formed in an annular shape having a circular cross section and is accommodated in the first damper accommodation portion 44 in a state where the first damper 19 is compressed in the radial direction of the rotating shaft 6. In this state, the above-described gap S1 is formed between the first bearing housing 17 and the first sleeve 18. The first sleeve 18 can be elastically displaced in the radial direction of the rotating shaft 6 by the gap S1. That is, the first damper 19 can elastically absorb thermal deformation in the radial direction of the rotating shaft 6 generated in the rotating shaft 6 or the bearing device 11, assembly tolerance, and disturbance elements such as vibrations generated at the time of rotation.

The first damper 19 supports the first sleeve 18 such that the first sleeve 18 can be displaced with respect to the first bearing housing 17 in the axis O direction of the rotating shaft 6. In other words, in a case where the thermal deformation, the assembly tolerance, and the disturbance elements such as vibrations generated at the time of rotation act on the first sleeve 18 in the axis O direction, the first damper 19 selects conditions (for example, conditions of modulus of elasticity, a crush rate, a surface friction coefficient, or the like) by which the first sleeve 18 can be displaced in the axis O direction. Accordingly, the thermal deformation, the assembly tolerance, and the disturbance elements such as vibrations generated at the time of rotation acting in the axis O direction can be absorbed by the preload spring 32.

Here, the above-described spacer 37 is fixed to the rotating shaft 6 by a nut 47. A sensor target St is formed on an end portion 42 of the spacer 37 so as to protrude in the radial direction. The sensor target St is detected by a sensor (not shown), and thus, a rotation speed of the rotating shaft 6 can be detected.

Figure 3:
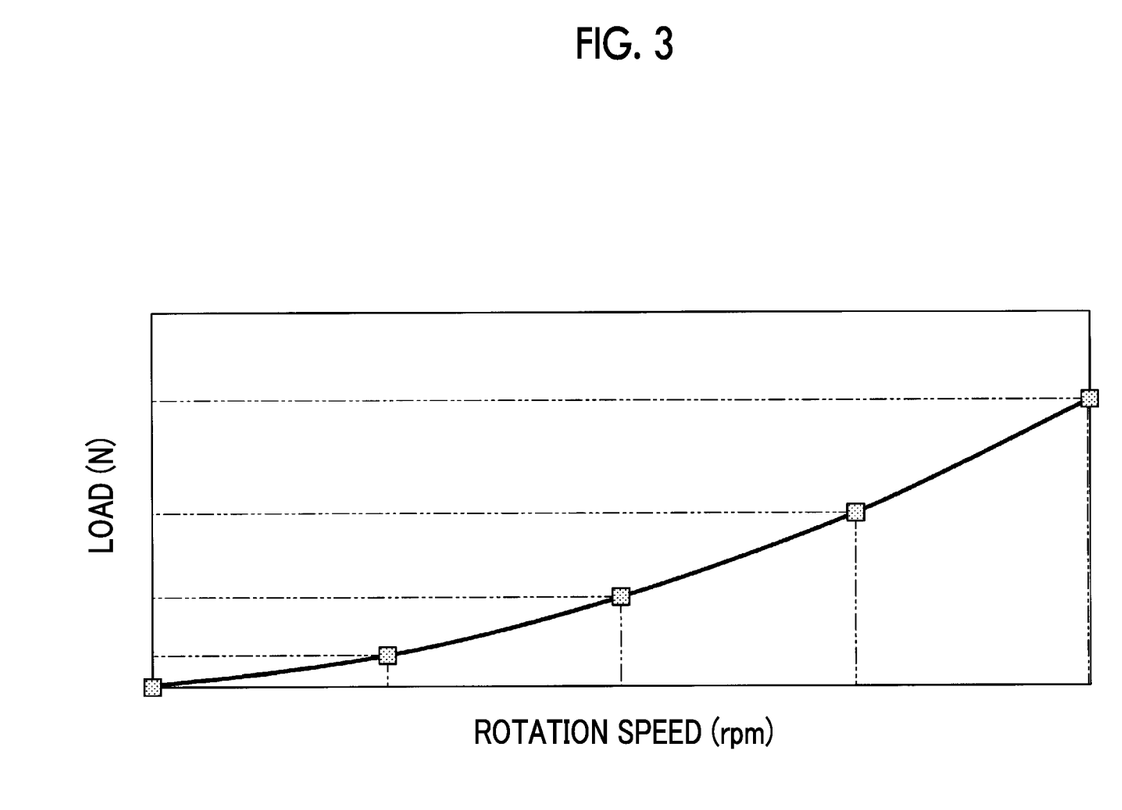
FIG. 3 is a graph in which a vertical axis is a load (N) and a horizontal axis is a rotation speed (rpm).

FIG. 3 is a graph in which a vertical axis is a load (N) and a horizontal axis is a rotation speed (rpm). The load (N) is a load which is required to displace the first sleeve 18 in the axis O direction. This load (N) can be obtained by simulation based on load conditions of a component force in the axis O direction or the like of a starting frictional force by the crush rate of the first damper 19, a starting frictional force in a stationary state of the first damper 19, and a force toward the outside in the radial direction caused by the thermal deformation, the assembly tolerance, and the disturbance elements such as vibrations at the time of rotation. Here, for example, the starting frictional force in a stationary state of the first damper 19 has a correlation with a friction coefficient on the surface of the first damper 19. The rotation speed (rpm) is the rotation speed of the electric motor 10, that is, the rotation speed of the rotating shaft 6. The rotation speed can be detected using the sensor target St.

As shown by a solid line in FIG. 3, the load (N) increases as the rotation speed (rpm) increases. A rate of increase of the load (N) gradually increases as the rotation speed (rpm) increases. In this embodiment, a spring force of the preload spring 32 is set so as to be larger than the load (N) corresponding to the maximum rotation speed of the electric motor 10 of the drive portion 3 to which the bearing device 11 is applied.

As shown in FIG. 2, the second bearing device 13 includes a second rolling bearing 49, a second bearing housing 50, a second sleeve 51, and a second damper 52. The second bearing device 13 is disposed between the electric motor 10 and the compressor wheel 4. Compared to the first bearing device 12, the second bearing device 13 has a simplified structure such as the preload spring 32 being omitted.

The second rolling bearing 49 is different from the first rolling bearing 16 in the orientation in the axis O direction, and other structures are the same as each other. That is, the second rolling bearing 49 includes the inner ring 20, the outer ring 21, the rolling body 22, the holder 23, and the seal member 24.

The second sleeve 51 is formed in an annular shape. The second sleeve 51 is disposed inside the second bearing housing 50 in the radial direction of the rotating shaft 6. Similarly to the first bearing device 12, a gap is formed between the second sleeve 51 and the second bearing housing 50. The second sleeve 51 includes a second bearing holding portion 48 and a detent portion 53. The second bearing holding portion 48 is formed in an annular shape which externally covers the second rolling bearing 49 in the radial direction of the rotating shaft 6. The second bearing holding portion 48 holds the outer ring 21 of the second rolling bearing 49 such that the outer ring 21 cannot be displaced in the axis O direction and in the circumferential direction of the rotating shaft 6. The second bearing holding portion 48 includes a second inner peripheral surface 54 which comes into surface contact with the entire surface of the outer peripheral surface 25 of the outer ring 21.

The detent portion 53 is formed in a portion of the second bearing holding portion 48 on the compressor portion 2 side. The detent portion 53 and the second bearing holding portion 48 are integrally formed with each other. The detent portion 53 has a locking recessed portion 55. A second pin 56 is inserted into the locking recessed portion 55 in the axis O direction. Accordingly, similarly to the first sleeve 18, the displacement of the second sleeve 51 with respect to the second bearing housing 50 in the circumferential direction of the rotating shaft 6 is restricted.

The second bearing housing 50 externally covers the second sleeve 51 in the radial direction of the rotating shaft 6. The second bearing housing 50 includes a closing member 57 and a housing main body 58. Similarly to the first bearing housing 17, second damper accommodation portions 58a are formed in the housing main body 58. The second bearing housing 50 and the first bearing housing 17 configure the above-described housing 14.

The closing member 57 closes a housing opening portion 59. The housing opening portion 59 is formed around the rotating shaft 6 of the housing main body 58 on the compressor portion 2 side. The closing member 57 is formed in a ring shape having a hole 60, through which the rotating shaft 6 passes, at the center of the closing member 57. The closing member 57 is joined to the housing main body 58 by a bolt 61 or the like.

The closing member 57 has a second through-hole 62, through which the second pin 56 can pass, at a position corresponding to the locking recessed portion 55 of the above-described second sleeve 51. The second pin 56 is inserted into the locking recessed portion 55 via the second through-hole 62. Accordingly, the displacement of the second sleeve 51 in the circumferential direction with respect to the closing member 57 joined to the housing main body 58 is restricted. Meanwhile, the second sleeve 51 can be displaced with respect to the closing member 57 in the axis O direction. Here, in this embodiment, a ring-shaped bush 63 is mounted between the closing member and the rotating shaft 6, and the periphery of the rotating shaft 6 is sealed by the bush 63.

The second damper accommodation portion 58a is formed on the second inner peripheral surface 54 of the housing main body 58. More specifically, the second damper accommodation portion 58a is formed to face the outer peripheral surface 51a of the second sleeve 51 at a position on the outside in the radial direction of the second rolling bearing 49 on the second inner peripheral surface 54 of the housing main body 58. In this embodiment, two second damper accommodation portions 58a are provided at an interval therebetween in the axis O direction. The second damper 52 is accommodated in each of the second damper accommodation portions 58a. In this embodiment, the second damper accommodation portion 58a is an annular angular groove which is continuous in the circumferential direction of the first bearing housing 17.

The second damper 52 is provided between the housing main body 58 and the second sleeve 51. The second damper elastically supports the second sleeve 51. In this embodiment, similarly to the first damper 19, the second damper 52 is formed in an annular shape having a circular cross section and is accommodated in the second damper accommodation portion 58a in a state where the second damper 52 is compressed in the radial direction of the rotating shaft 6. In this state, a gap is formed between the second bearing housing 50 and the second sleeve 51. The second sleeve 51 can be elastically displaced in the radial direction of the rotating shaft 6 by the gap. That is, the second damper 52 can elastically absorb thermal deformation in the radial direction of the rotating shaft 6 generated in the rotating shaft 6 or the bearing device 11, assembly tolerance, and disturbance elements such as vibrations generated at the time of rotation. Here, similarly to the first damper 19, the second damper 52 supports the second sleeve 51 such that the second sleeve 51 can be displaced with respect to the housing main body 58 in the axis O direction.

In the above-described first embodiment, the first sleeve 18 is provided so as not to be displaceable with respect to the outer ring 21 in the radial direction and the circumferential direction of the rotating shaft 6. Accordingly, it is possible to prevent the first rolling bearing 16 and the first sleeve 18 from coming into intermittent contact with each other due to vibrations of the rotating shaft 6.

In addition, the first sleeve 18 is supported by the first bearing housing 17 so as to be displaceable in the axis O direction of the rotating shaft 6 via the first damper 19. Accordingly, even in a case where thermal deformation and assembly tolerance in the axis O direction of the first rolling bearing 16, the rotating shaft 6, or the like and disturbances when the rotating shaft 6 rotates are generated, the first sleeve 18 can be displaced with respect to the first bearing housing 17 in the axis O direction so as to escape.

In addition, the rotation of the first sleeve 18 with respect to the first bearing housing 17 is prevented. Therefore, the first rolling bearing 16 is prevented from rotating with respect to the first bearing housing 17. Accordingly, it is possible to prevent the rotation of the outer ring 21 without cutting the outer ring 21 or the like.

As a result, it is possible to easily prevent the rotation of the outer ring 21 while absorbing thermal deformation, assembly tolerance, and disturbance elements at the time of rotation. Moreover, it is possible to prevent the first sleeve 18, the outer ring 21, or the like from being worn.

In addition, the outer ring 21 is press-fitted to the first sleeve 18. Accordingly, it is possible to easily restrict the displacement of the first sleeve 18 with respect to the outer ring 21.

Moreover, it is possible to apply a preload to the rolling bearing by the preload portion 29. In addition, the preload portion 29 can elastically absorb the thermal deformation and the assembly tolerance of the rotating shaft 6 or the like and the displacement of the first sleeve 18 in the axis O direction caused by the disturbances at the time of rotation.

In addition, according to the above-described first embodiment, it is possible to decrease vibrations or noise generated when the compressor wheel 4 rotates. As a result, it is possible to improve merchantability of the supercharger 1 and it is possible to increase durability due to a decrease in wear.

Second Embodiment

Next, a second embodiment of the present invention will be described based on the drawings. The second embodiment is different from the above-described first embodiment only in the configuration of a first sleeve. Accordingly, the same reference numerals are assigned to the same portions as those of the first embodiment. In addition, in the second embodiment, descriptions overlapping with the descriptions of the first embodiment will be omitted.

Similarly to the first embodiment, the supercharger 1 of the second embodiment includes the compressor portion 2 and the drive portion 3 (refer to FIG. 1). The drive portion 3 includes the electric motor 10 and the bearing device 11. The bearing device 11 rotatably supports the rotating shaft 6 on both outer sides of the electric motor 10 in the axis O direction of the rotating shaft 6. The first bearing device 12 is disposed on a side opposite to the compressor portion 2 in a state where the electric motor 10 is interposed therebetween. The second bearing device 13 is disposed between the electric motor 10 and the compressor portion 2.

Figure 4:
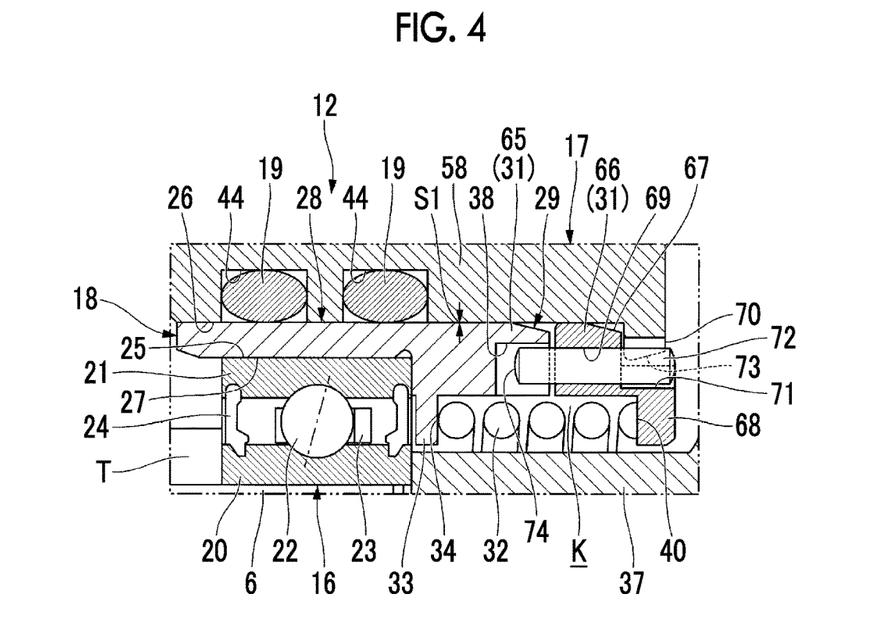
FIG. 4 is an enlarged view of a first bearing device in a second embodiment of the present invention.

FIG. 4 is an enlarged view of the first bearing device in the second embodiment of the present invention.

As shown in FIG. 4, the first bearing device 12 includes the first rolling bearing 16, the first bearing housing 17 (housing), the first sleeve 18 (damping member), and the first damper 19.

Similarly to the first embodiment, the first sleeve 18 includes the bearing holding portion 28 and the preload portion 29. The preload portion 29 includes the preload portion main body 31 and the preload spring 32.

In the second embodiment, the preload portion main body 31 is divided into two in the axis O direction. In other words, the first sleeve 18 is divided into two in the axis O direction. More specifically, the preload portion main body 31 includes a first main body portion 65 (first member) and a second main body portion 66 (second member). The first main body portion 65 is integrally formed with the bearing holding portion 28. The second main body portion 66 is separately formed from the first main body portion 65. The second main body portion 66 is disposed to be arranged with the first main body portion 65 in the axis O direction.

The first main body portion 65 includes the protrusion 33 and the locking hole 38. The locking hole has an opening at a position facing the second main body portion 66.

The second main body portion 66 is formed in an annular shape about the axis O. The second main body portion 66 includes a penetration portion 67 and a spring support portion 68. The penetration portion 67 has a through-hole 69 which penetrates in the axis O direction such that a locking pin 72 can be inserted into the through-hole 69. The penetration portion 67 is disposed so as to be interposed via a slight gap between the penetration portion 67 and each of the projection portion 70 of the first bearing housing 17 and the first main body portion 65 in the axis O direction. Accordingly, the penetration portion 67 is restrained from being displaced in the axis O direction to be equal to or more than the size of the gap.

The second main body portion 66 includes a recessed portion 71. The recessed portion 71 is recessed inward in the radial direction of the rotating shaft 6. The recessed portion 71 is formed to avoid the opening of the through-hole 69 such that the pin 72 can be inserted into the through-hole 69 from a side opposite to the first main body portion 65 in the axis O direction.

The spring support portion 68 is formed at the position at which the recessed portion 71 is formed in the axis O direction. The spring support portion 68 extends inward in the radial direction of the rotating shaft 6 from the second main body portion 66. The spring support portion 68 supports the second end portion 40 of the preload spring 32.

In this embodiment, similarly to the projection portion 43 of the first embodiment, the projection portion 70 of the first bearing housing 17 extends inward in the radial direction of the rotating shaft 6 from the housing main body 58. An inside end portion 73 of the projection portion 70 is recessed outward in the radial direction of the rotating shaft 6 so as not to hinder the insertion of the pin 72. In addition, the inside end portion 73 of the projection portion 70 is formed so as to wrap around the circumferential direction of the rotating shaft 6 with respect to the pin 72 in order to prevent the pin 72 from being displaced in the circumferential direction of the rotating shaft 6.

The pin 72 is formed in a columnar shape extending in the axis O direction. The pin 72 is inserted into the through-hole 69 through the recessed portion 71. Accordingly, if the pin 72 is displaced with respect to the housing main body 58 in the circumferential direction of the rotating shaft 6, the pin 72 abuts on the projection portion 70 of the housing main body 58. Therefore, the penetration portion 67 into which the pin is inserted cannot be displaced with respect to the housing main body 58 in the circumferential direction of the rotating shaft 6.

An end portion 74 of the pin 72 which passes through the penetration portion 67 is inserted into the locking hole 38. Accordingly, the displacement of the first main body portion 65 with respect to the second main body portion 66 in the circumferential direction of the rotating shaft 6 is restricted. Here, in a state where the pin 72 is inserted, a slight gap is formed between the first main body portion 65 and the second main body portion 66 and between the second main body portion 66 and the projection portion 70 in the axis O direction. The first sleeve 18 can be slightly displaced in the axis O direction by the gaps. For example, in a case where the pin 72 is removed for maintenance or the like, the second main body portion 66 can be removed from the first main body portion 65 and the housing main body 58.

That is, the second main body portion 66 is connected to the first main body portion 65 so as not to be displaceable in the circumferential direction of the rotating shaft 6 and so as to be displaceable in the axis O direction thereof. The second main body portion 66 is detachably fixed to the housing main body 58 and is joined to the housing main body 58 so as not to be displaceable in the axis O direction and the circumferential direction of the rotating shaft 6.

Therefore, according to the second embodiment, when the first bearing device 12 is assembled, it is possible to prevent the rotations of the first main body portion 65 and the outer ring 21 with respect to the housing main body 58 via the second main body portion 66. Accordingly, after the first main body portion 65 is assembled into the housing main body 58, the preload spring 32 and the second main body portion 66 can be mounted. As a result, the assembly can be easily performed.

Moreover, the second main body portion 66 is detachably provided with respect to the first bearing housing 17. Accordingly, it is possible to disassemble the first bearing device 12 by only removing the second main body portion 66. Accordingly, the state of the first main body portion 65 can be easily confirmed.

The present invention is not limited to the configurations of each embodiment, and design thereof can be modified within a scope which does not depart from the gist.

For example, the above-described embodiments, the case where the outer ring 21 is press-fitted to the first sleeve 18 is described. However, the present invention is not limited to the configurations of each embodiment as long as the outer ring 21 is fixed to the first sleeve 18.

Figure 5:
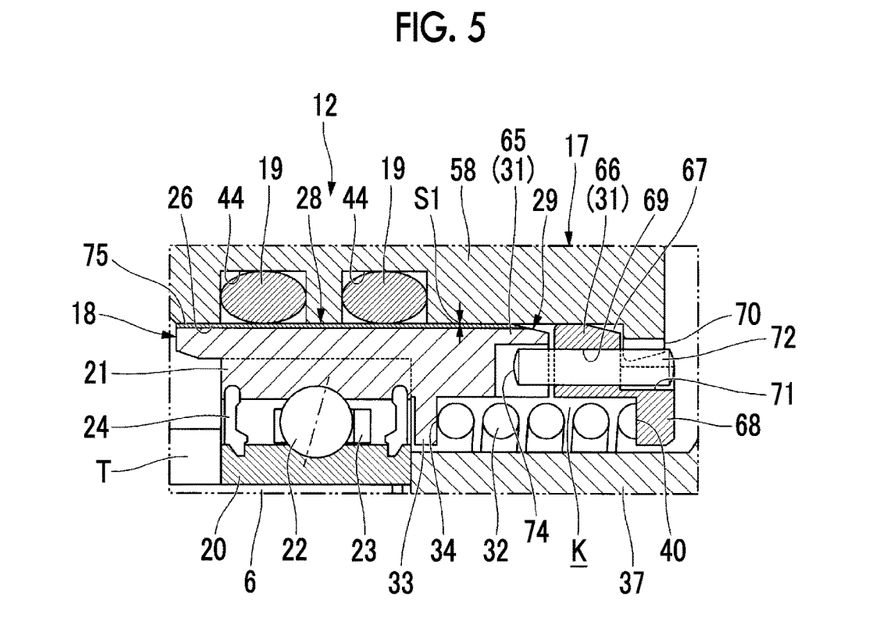
FIG. 5 is an enlarged view of a first bearing device in a first modification example of the first and second embodiments of the present invention.

FIG. 5 is an enlarged view of a first bearing device in a first modification example of the first and second embodiments of the present invention. For example, as shown in FIG. 5, the outer ring 21 and the first sleeve 18 may be integrally formed with each other. Here, FIG. 5 shows a case where the first modification example is applied to the first sleeve 18 of the second embodiment. However, the first modification example may be applied to the first sleeve 18 of the first embodiment. In this case, preferably, a layer 75 which is formed of a material which is softer than that of the outer ring 21 of the first embodiment may be provided on the outer peripheral surface of the first sleeve 18. Since the soft layer 75 is provided, even in the case where the first sleeve 18 and the outer ring 21 are integrally formed with each other, it is possible to prevent aggressiveness of the first sleeve 18 with respect to the first bearing housing 17.

In addition, in the above-described embodiments, the case where the first damper 19 has a circular cross section is described. However, the shape of the first damper 19 is not limited to a circular cross section.

Figure 6:
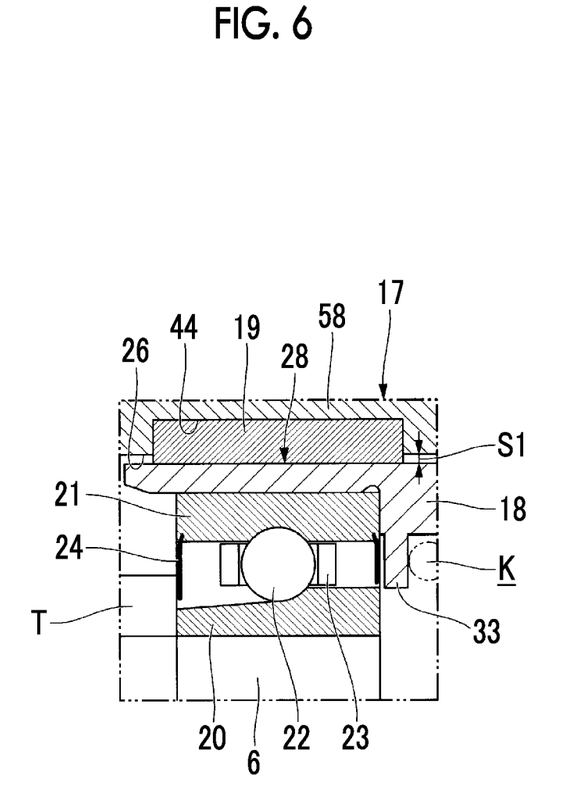
FIG. 6 is a partially enlarged view of a first bearing device in a second modification example of the first and second embodiments of the present invention.

FIG. 6 is a partially enlarged view of a first bearing device in a second modification example of the first and second embodiments of the present invention. For example, as shown in FIG. 6, a sheet-shaped first damper 19 may be used. In addition, in the above-described embodiments, the case where the two first dampers 19 are disposed to be arranged in the axis O direction is described. However, only one first damper 19 may be provided or three or more first dampers 19 may be disposed to be arranged in the axis O direction. In addition, in the above-described embodiments, the case where the first damper accommodation portion 44 has an angular groove having a rectangular cross section is described as an example. However, the shape of the first damper accommodation portion 44 is not limited to the angular groove. For example, the first damper accommodation portion 44 may be a U groove or a V groove. In addition, the first damper accommodation portion 44 may be provided in the first sleeve 18 or may be in both the first bearing housing 17 and the first sleeve 18.

Moreover, in the above-described embodiments, the bearing device 11 used in the supercharger 1 is described as an example. However, the bearing device 11 of the present invention is not limited to the case where the bearing device 11 is used in the supercharger 1. The bearing device 11 may be used for a bearing device of a rotary machine other than the supercharger. Moreover, in each embodiment, the case where the supercharger 1 is mounted on a vehicle such as an automobile is described. However, the supercharger of the present invention may be a supercharger which is mounted on an object other than the vehicle.

INDUSTRIAL APPLICABILITY

According to the bearing device and the supercharger of the present invention, it is possible to easily prevent the rotation of the outer ring and decreasing wears while absorbing thermal deformation, assembly tolerance, and disturbance elements at the time of rotation.

REFERENCE SIGNS LIST

1: supercharger
2: compressor portion
3: drive portion
4: compressor wheel
5: compressor housing
6: rotating shaft
6a: outer peripheral surface
7: shaft end portion
8: space
10: electric motor
11: bearing device
11a: rotor
11b: stator
12: first bearing device
13: second bearing device
14: housing
15: wall surface
16: first rolling bearing
17: first bearing housing
17a: main body
18: first sleeve
18a: outer peripheral surface
19: first damper
20: inner ring
21: outer ring
21a: end surface
22: rolling body
23: holder
24: seal member
25: outer peripheral surface
26: inner peripheral surface
27: inner peripheral surface
28: bearing holding portion
29: preload portion
30: end portion
31: preload portion main body
31a: vertical surface
31b: end portion
32: preload spring
33: protrusion
34: first end portion
35: outer peripheral surface
36: recessed portion
37: spacer
38: locking hole
39: pin
40: second end portion
41: support portion
42: end portion
43: projection portion
44: first damper accommodation portion
45: through-hole
47: nut
48: second bearing holding portion
49: second rolling bearing
50: second bearing housing
51: second sleeve
51a: outer peripheral surface
52: second damper
53: detent portion
54: second inner peripheral surface
55: locking recessed portion
56: second pin
57: closing member
58: housing main body
58a: second damper accommodation portion
59: housing opening portion
60: hole
61: bolt
62: second through-hole
63: bush
65: first main body portion
66: second main body portion
67: penetration portion
68: spring support portion
69: through-hole
70: projection portion
71: recessed portion
72: pin
73: inside end portion
74: end portion
75: layer
K: accommodation space
O: axis
St: sensor target
T: projection

The invention claimed is:
1. A bearing device comprising:
a rolling bearing which rotatably supports a rotating shaft;
a housing which externally covers the rolling bearing in a radial direction of the rotating shaft;
a sleeve which is disposed inside the housing in the radial direction of the rotating shaft with a gap therebetween and is provided so as not to be displaceable with respect to an outer ring of the rolling bearing in the radial direction and a circumferential direction of the rotating shaft; and a damper which is provided between the housing and the sleeve to supports the sleeve so as to be displaceable with respect to the housing in an axial direction of the rotating shaft, and absorbs displacement in the radial direction of the rotating shaft generated in the sleeve, wherein the sleeve includes a bearing holding portion which is provided outside the outer ring of the rolling bearing in the radial direction of the rotating shaft and a preload portion which elastically presses the outer ring in the axial direction of the rotating shaft, wherein the preload portion includes a preload portion main body which is integrally formed with the bearing holding portion and a preload spring which urges the sleeve in the axial direction of the rotating shaft, wherein the preload portion main body includes a protrusion which extends inward in the radial direction of the rotating shaft and a locking hole which is formed on an end portion on a side opposite to the bearing holding portion in the axial direction of the rotating shaft, wherein the housing includes a projection portion which faces the protrusion in the axial direction of the rotating shaft to interpose the preload spring between the protrusion and the projection portion, and includes a through-hole at a position facing the locking hole, and wherein a detent pin which is inserted into the locking hole and the through-hole and restricts a relative rotation between the housing and the sleeve in the circumferential direction of the rotating shaft is provided.

2. The bearing device according to claim 1,
wherein the outer ring is press-fitted to the sleeve.

3. The bearing device according to claim 2,
wherein the sleeve is formed to be divided into at least two of a first member and a second member in the axial direction of the rotating shaft, wherein the first member is provided so as not to be displaceable with respect to the outer ring in the radial direction and the circumferential direction of the rotating shaft, and wherein the second member is connected to the first member so as not to be displaceable in the circumferential direction of the rotating shaft and so as to be displaceable in the axial direction of the rotating shaft, is detachably fixed to the housing, and is joined to the housing so as not to be displaceable in the axial direction and the circumferential direction of the rotating shaft.

4. A supercharger comprising:
a compressor wheel;
an electric motor which drives the compressor wheel; and
the bearing device according to claim 2.

5. The bearing device according to claim 1,
wherein the outer ring is integrally formed with the sleeve.

6. The bearing device according to claim 5,
wherein the sleeve is formed to be divided into at least two of a first member and a second member in the axial direction of the rotating shaft, wherein the first member is provided so as not to be displaceable with respect to the outer ring in the radial direction and the circumferential direction of the rotating shaft, and wherein the second member is connected to the first member so as not to be displaceable in the circumferential direction of the rotating shaft and so as to be displaceable in the axial direction of the rotating shaft, is detachably fixed to the housing, and is joined to the housing so as not to be displaceable in the axial direction and the circumferential direction of the rotating shaft.

7. A supercharger comprising:
a compressor wheel;
an electric motor which drives the compressor wheel; and
the bearing device according to claim 5.

8. The bearing device according to claim 1,
wherein the sleeve is formed to be divided into at least two of a first member and a second member in the axial direction of the rotating shaft, wherein the first member is provided so as not to be displaceable with respect to the outer ring in the radial direction and the circumferential direction of the rotating shaft, and wherein the second member is connected to the first member so as not to be displaceable in the circumferential direction of the rotating shaft and so as to be displaceable in the axial direction of the rotating shaft, is detachably fixed to the housing, and is joined to the housing so as not to be displaceable in the axial direction and the circumferential direction of the rotating shaft.

9. A supercharger comprising:
a compressor wheel;
an electric motor which drives the compressor wheel; and
the bearing device according to claim 8.

10. A supercharger comprising:
a compressor wheel;
an electric motor which drives the compressor wheel; and
the bearing device according to claim 1.

* * * * *